US011875513B2

(12) United States Patent
Li et al.

(10) Patent No.: US 11,875,513 B2
(45) Date of Patent: Jan. 16, 2024

(54) SELF-ADAPTIVE POINT CLOUD STRIPE DIVISION METHOD (71) Applicant: PEKING UNIVERSTIY SHENZHEN GRADUATE SCHOOL, Shenzen (CN)

(72) Inventors: Ge Li, Guangdong (CN); Yiting Shao, Guangdong (CN); Jiamin Jin, Guangdong (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 466 days.

(21) Appl. No.: 17/265,897

(22) PCT Filed: Apr. 12, 2019

(86) PCT No.: PCT/CN2019/082391
§ 371 (c)(1),
(2) Date: Feb. 4, 2021

(87) PCT Pub. No.: WO2020/206669
PCT Pub. Date: Oct. 15, 2020

(65) Prior Publication Data
US 2021/0183068 A1  Jun. 17, 2021

(30) Foreign Application Priority Data

Apr. 9, 2019  (CN) .......................... 201910280541.7

(51) Int. Cl.
*G06K 9/00*  (2022.01)
*G06T 7/12*  (2017.01)
(Continued)

(52) U.S. Cl.
CPC ................ *G06T 7/12* (2017.01); *G06T 7/136* (2017.01); *G06T 17/00* (2013.01); *G06T 2207/20021* (2013.01); *G06T 2207/20221* (2013.01)

(58) Field of Classification Search
CPC ........... G06T 9/001; G06T 9/40; G06T 9/004; G06T 2207/10028; G06T 9/00;
(Continued)

(56) References Cited

U.S. PATENT DOCUMENTS

2012/0313944 A1*  12/2012  Kontkanen ........... G06T 15/506
  345/426
2013/0243292 A1*  9/2013  Khurd ..................... G06T 17/20
  382/131

(Continued)

FOREIGN PATENT DOCUMENTS

CN  103247041 A  8/2013
CN  106846425 A  6/2017
(Continued)

OTHER PUBLICATIONS

International Search Report and Written Opinion from related international application PCT/CN2019/082391, dated Jan. 6, 2020, all pages cited in its entirety.

Primary Examiner — Alex Kok S Liew
(74) Attorney, Agent, or Firm — Burr & Forman LLP (57) ABSTRACT A self-adaptive point cloud stripe division method. The method comprises: firstly, carrying out space division with a certain depth on a point cloud to obtain a plurality of local point clouds; then, counting the number of points in each of the local point clouds, comparing same with an upper and lower limit for the number of stripe points, and determining whether the number of points satisfies a requirement; and after a series of re-segmentation or re-fusion operations on the local point clouds, adjusting the number of points in each (Continued)

of the local point clouds until the number of points satisfies a range, thereby obtaining a final point cloud stripe. A plurality of local structures capable of being independently coded and decoded are obtained by means of division of a point cloud stripe, and this supports parallel processing, enhances system fault tolerance, and improves coding efficiency. Moreover, in consideration of the fact that the size of a point cloud stripe often has a limited range due to realistic factors of a large-scale point cloud, such as a limited transmission bandwidth, the method can satisfy such a requirement and make it possible to generate a plurality of point cloud stripes with a rational number of points while supporting parallel processing.

6 Claims, 4 Drawing Sheets

(51) Int. Cl.
*G06T 7/136* (2017.01)
*G06T 17/00* (2006.01)

(58) Field of Classification Search
CPC ......... G06T 17/00; G06T 7/50; G06T 17/005; G06T 2210/56; G06T 2210/36; G06T 3/4007; G06T 2210/12; G06T 9/007; G06T 11/20; G06T 15/08; G06T 2207/10012; G06T 3/40; G06T 7/11; G06T 7/60; G06T 7/70; G06T 7/75; G06T 1/20; G06T 1/60; G06T 15/506; G06T 19/20; G06T 9/005; G06T 15/00; G06T 15/10; G06T 2207/20021; G06T 2207/20221; G06T 2207/20224; G06T 2219/012; G06T 7/12; G06T 7/136
See application file for complete search history.

(56) References Cited

U.S. PATENT DOCUMENTS

2018/0158235 A1 6/2018 Wu et al.
2021/0012538 A1* 1/2021 Wang ..................... G06T 17/05

FOREIGN PATENT DOCUMENTS

| CN | 108470374 A | 8/2018 |
| CN | 109345619 A | 2/2019 |
| CN | 103077549 A | 5/2019 |

* cited by examiner

| Local point cloud | Number of points | Local point cloud | Number of points | Local point cloud | Number of points |
|---|---|---|---|---|---|
| $b_1$ | 845312 | $b_{13}$ | 925029 | $b_{25}$ | 1244831 |
| $b_2$ | 535681 | $b_{14}$ | 520686 | $b_{26}$ | 1714775 |
| $b_3$ | 656446 | $b_{15}$ | 23 | $b_{27}$ | 1059 |
| $b_4$ | 582375 | $b_{16}$ | 590563 | $b_{28}$ | 293902 |
| $b_5$ | 474778 | $b_{17}$ | 1070794 | $b_{29}$ | 723552 |
| $b_6$ | 1774 | $b_{18}$ | 96935 | $b_{30}$ | 839710 |
| $b_7$ | 664156 | $b_{19}$ | 3110 | $b_{31}$ | 927487 |
| $b_8$ | 402 | $b_{20}$ | 2374972 | $b_{32}$ | 246660 |
| $b_9$ | 1196557 | $b_{21}$ | 523 | $b_{33}$ | 102 |
| $b_{10}$ | 46067 | $b_{22}$ | 1894389 | $b_{34}$ | 2237 |
| $b_{11}$ | 182900 | $b_{23}$ | 13806 | $b_{35}$ | 206463 |
| $b_{12}$ | 1069448 | $b_{24}$ | 617 | | |

Fig. 3a

| Local point cloud | Number of points | Local point cloud | Number of points | Local point cloud | Number of points |
|---|---|---|---|---|---|
| s1 | 845312 | s15 | 520686 | s29 | 622415 |
| s2 | 535681 | s16 | 23 | s30 | 622416 |
| s3 | 656446 | s17 | 590563 | s31 | 857387 |
| s4 | 582375 | s18 | 1070794 | s32 | 857388 |
| s5 | 474778 | s19 | 96935 | s33 | 1059 |
| s6 | 1774 | s20 | 3110 | s34 | 293902 |
| s7 | 664156 | s21 | 791657 | s35 | 723552 |
| s8 | 402 | s22 | 791657 | s36 | 839710 |
| s9 | 598278 | s23 | 791658 | s37 | 927487 |
| s10 | 598279 | s24 | 523 | s38 | 246660 |
| s11 | 46067 | s25 | 947194 | s39 | 102 |
| s12 | 182900 | s26 | 947195 | s40 | 2237 |
| s13 | 1069448 | s27 | 13806 | s41 | 206463 |
| s14 | 925029 | s28 | 617 | | |

Fig. 3b

| Local point cloud | Number of points | Local point cloud | Number of points | Local point cloud | Number of points |
|---|---|---|---|---|---|
| F1 | 690496 | F10 | 722869 | F19 | 622416 |
| F2 | 690497 | F11 | 590563 | F20 | 857387 |
| F3 | 656446 | F12 | 1070794 | F21 | 858447 |
| F4 | 1058927 | F13 | 891702 | F22 | 1017454 |
| F5 | 664558 | F14 | 791657 | F23 | 839710 |
| F6 | 598278 | F15 | 791658 | F24 | 691474 |
| F7 | 827246 | F16 | 947717 | F25 | 691475 |
| F8 | 1069448 | F17 | 961618 | | |
| F9 | 722869 | F18 | 622415 | | |

Fig. 3c

| Test Conditions | Lossless geometric compression and near-lossless attribute compression | | | |
|---|---|---|---|---|
| | Attribute Code Rate Distortion Rate [%] | | | |
| | Brightness | Chroma Cb | Chroma Cr | Reflectance Rate |
| The first type of data set CaTl-A | +0.1% | +0.1% | +0.1% | |
| The second type of data set CaTl-A | +2.6% | +2.6% | +2.6% | +3.8% |
| The third type of data set CaTl-A | | | | 0.0% |
| Average Performance | +0.4% | +0.4% | +0.4% | +1.1% |

FIG. 4

SELF-ADAPTIVE POINT CLOUD STRIPE DIVISION METHOD

FIELD OF THE INVENTION

The invention belongs to the technical field of point cloud data processing and relates to a point cloud data segmentation method, in particular to a self-adaptive point cloud stripe division method.

BACKGROUND OF THE INVENTION

A three-dimensional point cloud is an important form of digital representation in the real world. With the rapid development of three-dimensional scanning equipment (laser, radar, etc.), the precision and resolution of the point cloud are higher. A high-precision point cloud is widely used in geographic information systems, urban digital map construction and free-view broadcasting, and plays a technical support role in hot research such as smart city, unmanned driving, cultural relics protection, and so on. The point cloud is obtained by sampling the surface of an object with three-dimensional scanning equipment, the number of points of one frame of the point cloud is generally millions, the number of points in a large-scale point cloud is even as high as tens of millions, each point contains geometric information, color, texture and other attribute information, and the data volume is very large. The huge data volume of a three-dimensional point cloud brings great challenges to data storage, transmission, and so on. In order to support the parallel processing of point cloud and improve system fault tolerance, it is necessary to divide large-scale point cloud into a series of independently processable point cloud strips.

At present, the division technology of point cloud strips is not common and is still in the exploration stage. However, the division of strips in traditional video coding is mainly divided into 2 types:

1) uniform strip division of a video image: uniformly dividing the single-frame image to obtain strips with the same geometric size;
2) non-uniform strip division of a video image: non-uniform division being carried out on the single-frame image, and the geometric sizes of the obtained strips being different.

SUMMARY OF THE INVENTION

In order to relieve the pressure of point cloud transmission and storage, the invention provides a self-adaptive point cloud stripe division method under the condition of considering the computational complexity.

According to the technical scheme provided by the invention, the method comprises: firstly, carrying out space division with a certain depth on a point cloud to obtain a plurality of local point clouds; then, counting the number of points in each of the local point clouds, comparing same with an upper and lower limit for the number of stripe points, and determining whether the number of points satisfies a requirement; and after a series of re-segmentation or re-fusion operations on the local point clouds, adjusting the number of points in each of the local point clouds until the number of points satisfies a range, thereby obtaining a final point cloud stripe. A plurality of local structures capable of being independently coded and decoded is obtained by means of division of a point cloud stripe, and this supports parallel processing, enhances system fault tolerance, and improves coding efficiency. Moreover, in consideration of the fact that the size of a point cloud stripe often has a limited range due to realistic factors of a large-scale point cloud, such as limited transmission bandwidth, the method disclosed by the invention can satisfy such a requirement and make it possible to generate a plurality of point cloud stripes with a rational number of points while supporting parallel processing.

The invention mainly comprises the following steps:

1) preliminarily dividing point cloud to obtain local point clouds: reading in the point cloud to be processed, preliminarily dividing geometric space of the point cloud, and then obtaining one group of local point clouds with an order by sorting;
2) comparing the number of points of the local point clouds with a limited range: due to transmission requirement and bandwidth limitation, the number of points in a point cloud stripe which supports parallel processing needing to meet a limited range (minSize, maxSize), wherein upper limit and lower limit of the number of points are maxSize and minSize respectively;
3) redividing or re-fusing the local point clouds to obtain a final point cloud stripe: on the basis of local point cloud division, redividing the local point cloud beyond the upper limit of the number of points, and fusing the local point cloud with the number of points less than the lower limit to obtain a point cloud stripe with the number of points meeting the limited range; redividing the local point cloud with the number of points exceeding the upper limit at intervals of maxSize to obtain one new group of local point clouds, wherein all the local point clouds are obtained through iterating; for the local point clouds with the number of points less than the lower limit, combining point cloud distribution and Morton code order, selecting to perform forward local point cloud fusion or backward local point cloud fusion.

Through the above steps, a point cloud stripe with the number of points meeting the limited range is obtained.

In step 1) an octree is used to divide a point cloud space, wherein a calculation process of a point cloud space bounding box is that three-dimensional coordinates of all points in the point cloud are iterated firstly, the minimum coordinate $x_{min}$ and the maximum coordinate $x_{max}$ of x axis are obtained, the minimum coordinate $y_{min}$ and the maximum coordinate $y_{max}$ of y axis are obtained, the minimum coordinate $z_{min}$ and the maximum coordinate $z_{max}$ of z axis are obtained, the most discrete edge length max_edge of point cloud distribution in the x, y and z axes are obtained:

$$\max{}_{edge} = \max((x_{max}-x_{min}), (y_{max}-y_{min}), (z_{max}-z_{min})). \quad \text{(Formula 1)}$$

and size of the bounding box of the point cloud is calculated by formula 2:

$$B = \max\_edge^3. \quad \text{(Formula 2)}.$$

The point cloud stripe division method in step 1) uses octree division to obtain local point clouds, comprising dividing current point cloud by an octree with depth d to obtain $Num0 = 8^d$ local point clouds; sorting all local point clouds by adopting three-dimensional Morton code so that spatial distribution of local point clouds can be organized into one group of local point clouds numbered $b_1, b_2, \ldots b_i, \ldots, b_{8^d}$.

When the number of points of the local point cloud is compared with the limited range in step 2), a threshold thres of the number of points beyond the standard ratio ratio of the local point cloud is set, followed by iterating all local point clouds obtained in step 1), and comparing a size relation of the number of points in each local point cloud with an upper range limit maxSize; when the number of points of the local point cloud exceeds maxSize, adding 1 to a counter num, and after the iteration is completed, calculating a proportion ratio of the local point cloud where the number of points exceeds maxSize; if the proportion ratio exceeds the threshold thres, then the current local point cloud structure being spatially divided; if the proportion ratio does not exceed the threshold thres, preliminary space division being completed such that the structure of the current local point cloud is kept and the next operation is carried out.

A method for re-segmenting the local point clouds in step 3) is implemented by traversing all local point clouds in an order of Morton code, wherein the local point cloud $b_i$ whose number of points exceeds maxSize need to be re-segmented with technical details of the re-segmentation including:

(1) firstly, distribution variances of the local point cloud $b_i$ along a three-dimensional coordinate axis being calculated as var_X(i), var_Y(i) and var_Z(i), respectively, wherein taking var_X(i) as an example, calculation formula is as follows:

$$\text{var\_X}(i) = \frac{1}{N} \sum_{n=1}^{N} (X_{i(n)} - \overline{X}_i)^2, \quad \text{(Formula 3)}$$

wherein i is an index of the current local point cloud in the order of the Morton code, N is the number of points numSize(i) in the current local point cloud $b_i$, $X_{i(n)}$ is X coordinate value of the $n^{th}$ point in the local point cloud $b_i$, and $\overline{X}_i$ is X coordinate mean value of all points in the local point cloud $b_i$;

(2) in the local point cloud, a coordinate axis with the maximum variance max (var_X(i), var_Y(i), var_Z(i)) being selected as a redivision direction, and the calculation formula of redivided number num being as follows:

$$num = \text{ceil}\left(\frac{N}{maxSize}\right); \quad \text{(Formula 4)}$$

through the above steps, one frame of complete point cloud being re-segmented to obtain one group of new local point clouds, and the total number thereof being Num.

A method for re-fusing the re-segmented local point clouds in step 3) comprises iterating all local point clouds according to the order of the Morton code, wherein the local point cloud $b_i$ with less number of points than minSize needs to be re-fused, and the fusion direction can be selected from forward fusion or backward fusion, wherein
assuming that the number of points of local point cloud after forward fusion is $b_i$(mergeFront) and the number of points of local point cloud after backward fusion is $b_i$(mergeNext), selection principle of a fusion direction is as follows:

(1) if $b_i$(mergeFront)>maxSize and $b_i$(mergeNext)>maxSize, the direction is selected to be max ($b_i$(mergeFront), $b_i$(mergeNext));
(2) if $b_i$(mergeFront)<maxSize and $b_i$(mergeNext)<maxSize, the direction is selected to be max ($b_i$(mergeFront), $b_i$(mergeNext));
(3) in other cases, the direction is selected to be min ($b_i$(mergeFront), $b_i$(mergeNext)).

The invention provides a self-adaptive point cloud stripe division method, which has the following technical advantages:
(1) each stripe is independently coded, random access is supported, coding efficiency is improved, accumulation and spread of coding errors are prevented, and fault tolerance of a system is enhanced.
(2) through the self-adaptive scheme design and the combination of the re-division and re-fusion technology, each stripe can meet the limited range of the number of points so as to adapt to the bandwidth requirement of point cloud transmission.

BRIEF DESCRIPTION OF THE DRAWINGS

FIGS. 2a and 2b are example diagrams of point cloud egyptian_mask_vox12 stripe division, wherein

FIGS. 3a, 3b and 3c are local point cloud cases for each step of point cloud citytunnel_q1mm stripe division, wherein

BEST MODE FOR CARRYING OUT THE INVENTION

The invention will now be further described, by way of embodiment, with reference to the accompanying drawings, without in any way limiting the scope of the invention.

Figure 1:
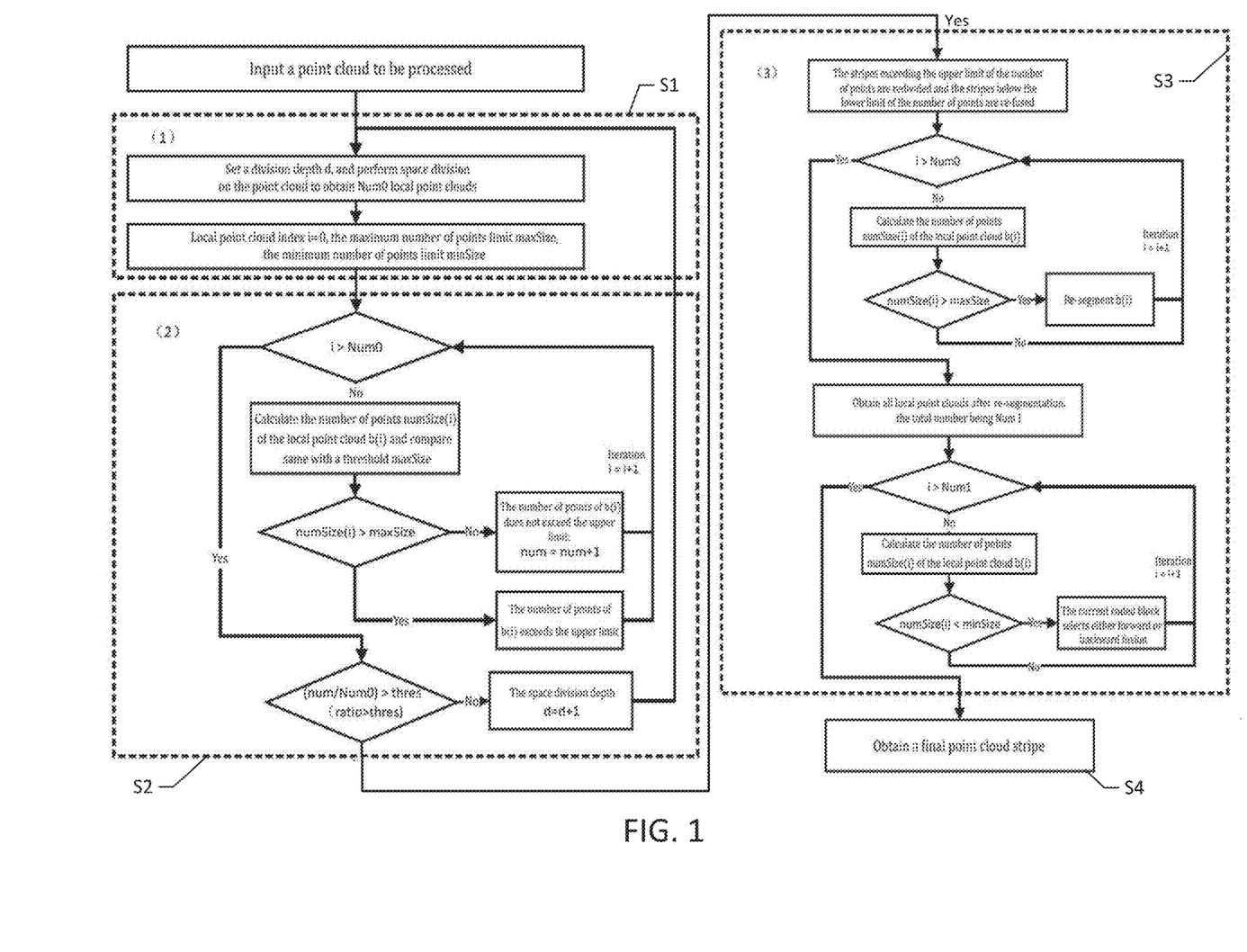
FIG. 1 is a flow diagram of a method provided by the present invention.

Instance 1:
In the following, aiming at the official point cloud data set egyptian_mask_vox12.ply in the MPEG point cloud compression working group, the point cloud stripe division is carried out by adopting the method of the present invention. FIG. 1 is a flow diagram of the method of the present invention. As shown in FIG. 1, the specific implementation steps are as follows.

(1) Preliminarily Dividing a Point Cloud to Obtain a Local Point Cloud S1

Reading in the point cloud to be processed, firstly, a preliminary division is performed on the geometric space of the point cloud, followed by setting a space division depth value as d, segmenting a point cloud space in an octree mode, dividing one frame of complete point cloud into $8^d$ local point clouds, and then obtaining a group of local point clouds with sequence by sorting. Taking point cloud egyptian_mask_vox12.ply as an example, there are 272684 points, and the preliminary division depth d of the octree is set as 1.

The point cloud is divided into $8^{\wedge}d=8$ local point clouds, and all the local point clouds are numbered according to the order of the Morton code such that the obtained local point cloud points are respectively as follows: $b_1=14737$, $b_2=38178$, $b_3=21684$, $b_4=61155$, $b_5=21663$, $b_5=39071$, $b_7=12309$ 和 $b_8=63887$.

(2) Comparing the Points of the Local Point Cloud with the Limited Range S2

Due to the transmission requirements and bandwidth limitations, the number of points in a point cloud stripe supporting parallel processing needs to meet a limited range (minSize, maxSize), wherein the upper and lower limits of the number of points are maxSize and minSize, respectively. Here, the maximum point value (maxSize) of the stripe is set as 40000, the minimum point value (minSize) is set as 20000, and the threshold of the standard compliance ratio of the number of stripe points is set as 50%.

By iterating all the local point clouds obtained in step 1), and comparing the number of the points of each local point cloud with the maximum number of points value of the stripe, it can be seen that the number of other stripe points does not exceed maxSize except the local point cloud $b_3$ and the local point cloud $b_7$. As a result, the standard compliance ratio of the number of the points of the local point cloud is 75% greater than the standard compliance threshold of 50% of the number of stripe points. The preliminary division is completed. Keep the current geometric division result and enter the next stage.

(3) Redividing the Local Point Cloud to Obtain a Point Cloud Stripe S3

All local point clouds are iterated to calculate the number of points contained in the local point clouds, the local point clouds with the number of points not exceeding maxSize are taken as point cloud stripes, and the local point clouds with the number of points exceeding maxSize are redivided. It can be seen from step (1) that number of points contained in the local point cloud $b_4$ and the local point cloud $b_8$ are 61155 and 63887 respectively, which need to be rebdivided: the original local point cloud $b_4$ is divided into stripes $S_4$ and $S_5$, and the original local point cloud $b_8$, is divided into stripes $S_9$ and $S_{10}$. It is divided into two sub-stripes with a uniform number of points respectively according to a dividing rule, and after redividing, the stripes are distributed as follows: $S_1=14737$, $S_2=38178$, $S_3=21684$, $S_4=30577$, $S_5=30578$, $S_6=21663$, $S_7=39071$, $S_8=12309$, $S_9=31943$ and $S_{10}=31944$.

(4) Fusing the Unqualified Stripes to Obtain a Point Cloud Final Stripe

All the point cloud stripes are iterated, and the point cloud stripes with the number of points smaller than minSize are fused. From step (3), it can be seen that stripe $S_1$ and stripe $S_8$ require forward or backward fusion. The fusion direction selection principle is as follows: select a direction when only one direction is available; when both directions are available, if the number of points after fusion is larger than maxSize or smaller than maxSize, the direction with a larger number of stripe points after fusion is selected; otherwise, the direction with a smaller number of points after fusion is selected.

Therefore, the stripe $S_1$ can only select backward fusion, and the number of points after fusion is 14737+38178=52915, which exceeds maxSize. Then the uniform division operation is performed to obtain 52915/2=26457.5, and then the new stripe $S_1'$ and stripe $S_2'$ with the number of points 26457 and 26458 respectively are obtained after division. Number of points of the original stripe $S_8$ is 12309, and the number of points after fusion with forward stripe $S_7$ or backward stripe $S_9$ exceeds maxSize, so the stripe $S_7$ with a larger number of points is selected for forward fusion, and the number of points after fusion is 12309+39071=51380. The division operation is performed such that the division results in two new stripes $S_8'$ and $S_9'$ with the number of points as 51380/2=25690.

Finally, the point cloud is divided into 10 stripes: $S_1'=26457$, $S_2'=26458$, $S_3'=21684$, $S_4'=30577$, $S_5'=30578$, $S_6'=21663$, $S_7'=25690$, $S_8'=25690$, $S_9'=31943$ and $S_{10}'=31944$.

Figure 2A:
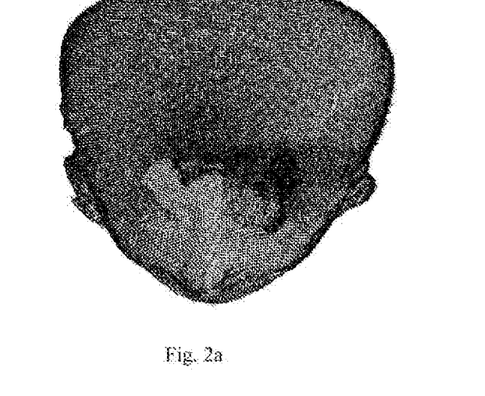
FIG. 2a is a complete point cloud egyptian_mask_vox12.ply.
Figure 2B:
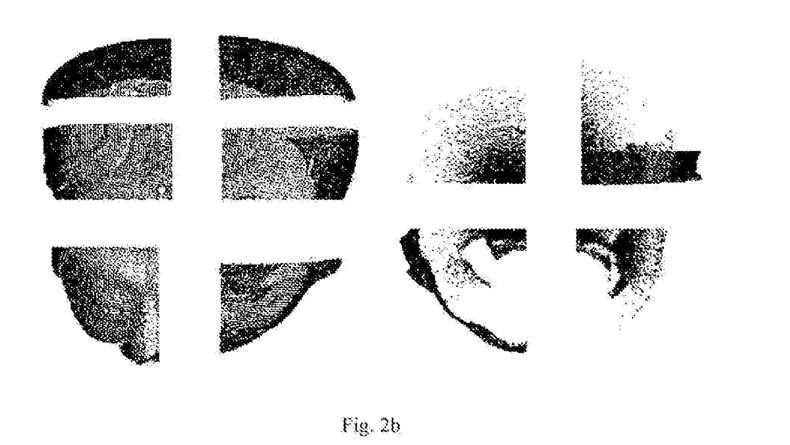
FIG. 2b shows 10 stripes of the point cloud that support independent coding and decoding and parallel processing excluding repeated points.

FIG. 2 is an example diagram of point cloud stripe division, wherein FIG. 2*a* is a complete point cloud egyptian_mask_vox12.ply; FIG. 2*b* shows 10 stripes of the point cloud. The 10 stripes respectively represent the local information of the current point cloud and exclude repeated points; meanwhile, the stripes support independent coding and decoding and parallel processing, and coding and decoding efficiency can be effectively improved.

Instance 2:

In the following, aiming at the official point cloud data set citytunnel_q1mm.ply in the MPEG point cloud compression working group, the point cloud stripe division is carried out by adopting the method of the invention. The specific implementation steps are as follows.

(1) Preliminarily Dividing the Point Cloud to Obtain a Local Point Cloud S1

The point cloud to be processed citytunnel_q1mm.ply is read in, wherein the point cloud has a total of 19948121 points. Firstly, the geometric space of the point cloud is preliminarily divided. The space division depth value d is set as 1, the point cloud space is segmented in an octree mode, one frame of the complete point cloud is divided into eight local point clouds, and then one group of local point clouds with order is obtained through sorting.

Then, an empty stripe without any point is removed from the 8 local point clouds of the point cloud, and finally, two local point clouds are obtained. All the local point clouds are numbered according to the order of the Morton code such that the number of points of the obtained local point cloud is respectively as follows: $b_1=9362991$, $b_2=10585130$.

(2) Comparing the Number of Points of the Local Point Cloud with the Limited Range S2

The maximum point value (maxSize) of the stripe is set as 1100000, the minimum point value (minSize) is set as 550000, and the threshold of the standard compliance ratio of the number of stripe points is set as 50%.

Figure 3A:
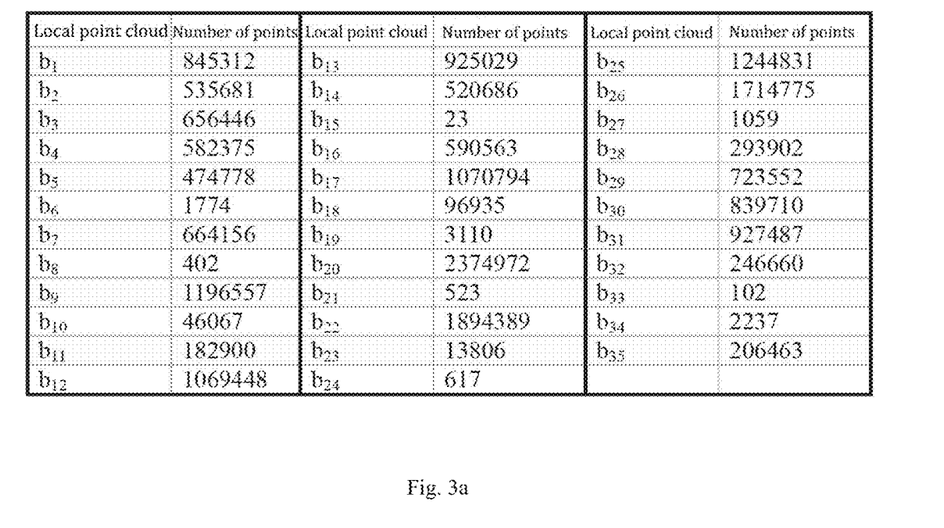
FIG. 3a shows the distribution of the number of points of the local point cloud obtained after the preliminary geometrical division of step S2 is completed by point cloud citytunnel_q1mm.

All the local point clouds obtained in step 1) are iterated, the number of points of each local point cloud is compared with the maximum number of points value of the stripe, and it can be seen that number of points of the two local point clouds far exceeds the maxsize. As a result, the standard compliance ratio of the number of points of the local point clouds is 0%, which is less than the standard compliance threshold of 50% of the number of stripe points. So the octree division depth is increased by 1, and the octree division in step 1) is repeated. Finally, when the octree depth is 4, a total of 35 local point clouds are obtained. FIG. 3*a* shows the number of points distribution of the local point cloud obtained after the preliminary geometrical division of step S2 is completed by the point cloud citytunnel_q1mm. As shown in FIG. 3*a*, in the number of points distribution of the local point cloud obtained after the preliminary geometrical division of step S2 is completed by the point cloud citytunnel_q1mm, it can be seen except the five local point clouds $b_9$, $b_{20}$, $b_{22}$, $b_{25}$, $b_{26}$, the number of points of other stripes does not exceed maxSize. As a result, the standard compliance ratio of the number of points of the local point clouds is 85.7%, which is greater than the standard compliance threshold of 50% of the number of points of the stripe. The preliminary division is completed. Keep the current geometric division result and enter the next stage.

(3) Redividing the Local Point Cloud to Obtain a Point Cloud Stripe S3

All local point clouds are iterated to calculate the number of points contained in the local point clouds, the local point clouds with the number of points not exceeding maxSize are taken as point cloud stripes, and the local point clouds with the number of points exceeding maxSize are redivided. It can be seen from step (1), that number of points contained by the local point clouds $b_9$, $b_{20}$, $b_{22}$, $b_{25}$, $b_{26}$ are 1196557, 2374972, 1894389, 1244831 and 1714775 respectively, which need to be redivided: according to the dividing rule, it is divided into two or more sub-stripes with uniform points, in which $b_9$, $b_{22}$, $b_{25}$, $b_{26}$ are divided into two sub-stripes; since $b_{20}$ contains 2374972 points, it is uniformly divided into three sub-stripes.

Figure 3B:
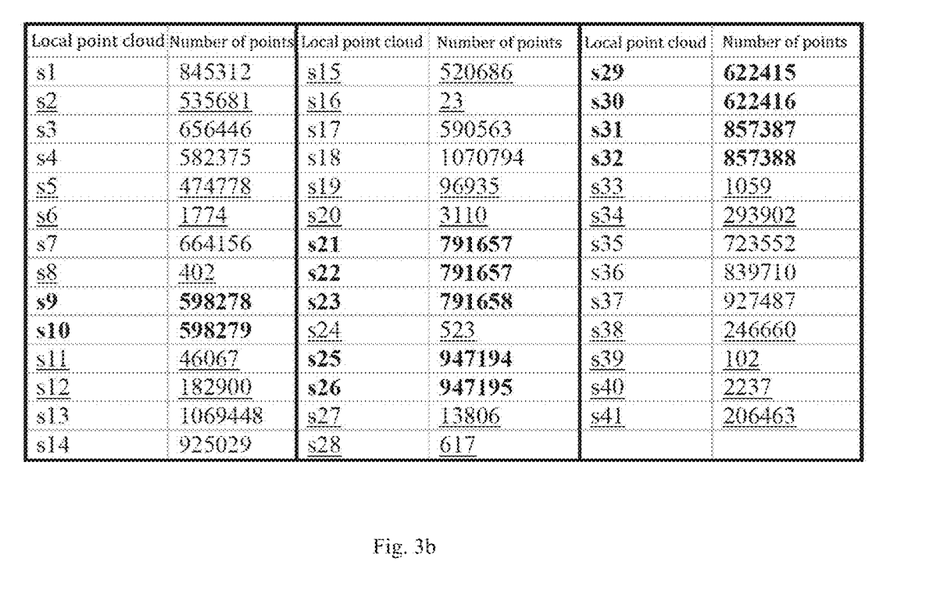
FIG. 3b shows the distribution of the number of points of the point cloud stripe obtained after the local point cloud is redivided in step S3.

FIG. 3b shows the number of points distribution of the point cloud stripe obtained after the local point cloud is redivided in step S3, and FIG. 3b shows the number of points distribution case of the point cloud stripe obtained after the local point cloud is redivided in step S3.

(4) Fusing the Unqualified Stripes to Obtain a Point Cloud Final Stripe

All stripes of the point cloud are iterated, and the point cloud stripes with the number of points smaller than minSize are fused. From step (3), it can be seen that the stripes $S_2$, $S_5$, $S_6$, $S_8$, $S_{11}$, $S_{12}$, $S_{15}$, $S_{16}$, $S_{19}$, $S_{20}$, $S_{24}$, $S_{27}$, $S_{28}$, $S_{33}$, $S_{34}$, $S_{38}$, $S_{39}$, $S_{40}$, $S_{41}$ in FIG. 3b require forward or backward fusion. The fusion direction selection principle is as follows: select a direction when only one direction is available; when both directions are available, if all number of points after fusion is larger than maxSize or smaller than maxSize, the direction with a larger number of stripe points after fusion is selected; otherwise, the direction with a smaller number of points after fusion is selected.

Figure 3C:
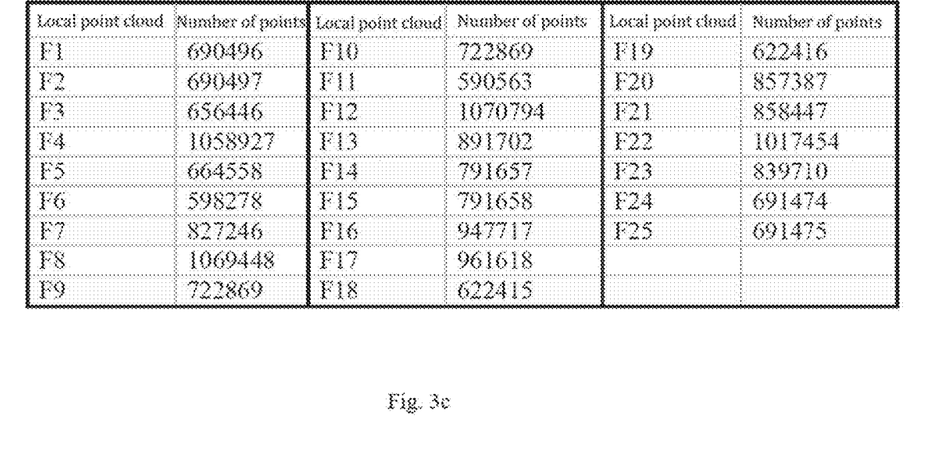
FIG. 3c shows the distribution of the number of points of the final point cloud stripe obtained after the unqualified stripes in step S3 are fused, wherein the stripes support independent coding and decoding and parallel processing excluding repeated points.

Finally, the point cloud is divided into 25 stripes, wherein the number of points information of each stripe is as shown in FIG. 3c. FIG. 3c shows the number of points distribution of the final point cloud stripes obtained after the unqualified stripes are fused in step S3, and the stripes support independent coding and decoding and parallel processing and exclude repeated points. All stripes of the point cloud support independent coding and decoding and parallel processing, wherein repeated points are excluded.

Figure 4:
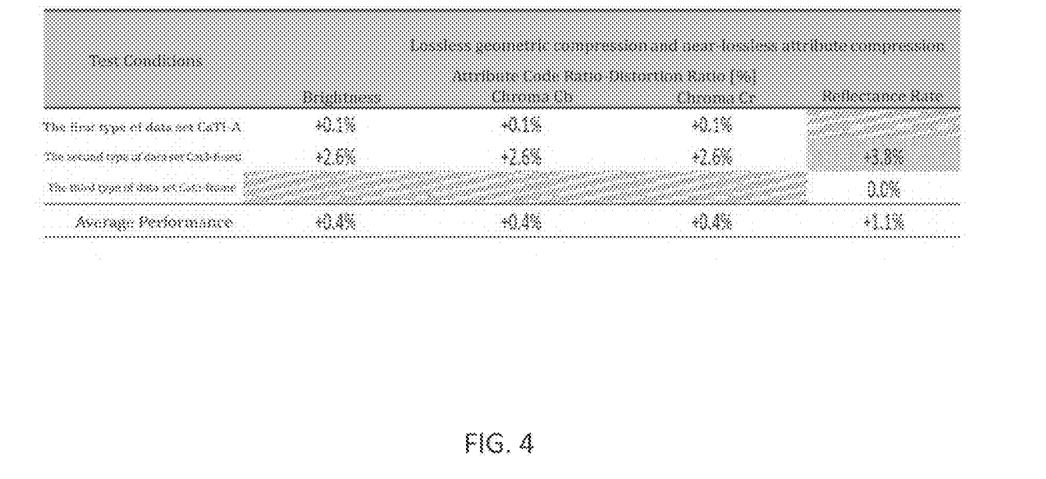
FIG. 4 is a table of compression performance change for test sets before and after a self-adaptive stripe division.

The adaptive strip division method provided by the invention not only provides a parallel processing solution for the current point cloud compression method, but also improves the compression performance of some data sets. Under the condition of geometric lossless compression and attribute near-lossless compression according to the requirements of MPEG official experiments, the compression performance change of test sets before and after adaptive strip division is tested with the first type of data set Cat 1-A, the second type of data set Cat 3-fused and the third type of data set Cat 3-frame as test sets. FIG. 4 shows the compression performance change of the test sets before and after adaptive strip division. As shown in FIG. 4, it can be seen that a certain performance gain is obtained on the first type of data set and the second type of data set, wherein the maximum performance can reach 3.8% on the second type of data set Cat 3-fused.

It should be noted that the embodiments are disclosed to aid in a further understanding of the present invention, but those skilled in the art will appreciate that: various alternatives and modifications are possible without departing from the spirit and scope of the invention and the appended claims. Therefore, it is intended that the invention not be limited to contents disclosed by the embodiments, and that the scope of the invention be determined by the scope defined by the claims appended hereto.

INDUSTRIAL APPLICABILITY

The self-adaptive point cloud stripe division method disclosed by the invention is widely applied to the construction of geographic information systems, urban digital maps, free viewpoint broadcasting and the like, and plays a technical supporting role in a plurality of hot research such as smart city, unmanned driving, cultural relics protection and the like.

The invention claimed is:

1. A self-adaptive point cloud stripe division method, specifically comprising the following steps:
   1) Preliminarily dividing point cloud to obtain local point clouds: reading in a point cloud to be processed, preliminarily dividing geometric space of the point cloud, and then obtaining one group of local point clouds with an order by sorting;
   2) Comparing number of points of the local point clouds with a limited range: due to transmission requirement and bandwidth limitation, the number of points in a point cloud stripe which supports parallel processing needing to meet a limited range, wherein upper limit and lower limit of the number of points are maxSize and minSize respectively;
   3) Redividing or re-fusing the local point clouds to obtain a final point cloud stripe: on the basis of local point cloud division, redividing the local point cloud beyond the upper limit of the number of points, and fusing the local point cloud with the number of points less than the lower limit to obtain a point cloud stripe with the number of points meeting the limited range; redividing the local point cloud with the number of points exceeding the upper limit at intervals of maxSize to obtain one new group of local point clouds, wherein all the local point clouds are obtained through iterating; for the local point clouds with the number of points less than the lower limit, combining point cloud distribution and Morton code order, selecting to perform forward local point cloud fusion or backward local point cloud fusion;
   (4) obtaining a point cloud stripe with the number of points meeting the limited range.

2. The point cloud stripe division method according to claim 1, characterized in that in step 1) an octree is used to divide a point cloud space, wherein a calculation process of a point cloud space bounding box is that three-dimensional coordinates of all points in the point cloud are iterated firstly, the minimum coordinate $x_{min}$ and the maximum coordinate $x_{max}$ of x axis are obtained, the minimum coordinate $y_{min}$ and the maximum coordinate $y_{max}$ of y axis are obtained, the minimum coordinate $z_{min}$ and the maximum coordinate $z_{max}$ of z axis are obtained, the most discrete edge length max_edge of point cloud distribution in the x, y and z axes are obtained:

$$\mathrm{max}_{edge}=\mathrm{max}((x_{max}-x_{min}),(y_{max}-y_{min}),(z_{max}-z_{min})).$$

and size of the bounding box of the point cloud is calculated by formula 2:

$$B=\mathrm{max\_edge}^3.$$

3. The point cloud stripe division method according to claim 1, characterized in that a method for sorting local point clouds divided by the octree in step 1) comprises the following steps: dividing current point cloud by an octree with depth d to obtain Num0=$8^d$ local point clouds; sorting all local point clouds by adopting three-dimensional Morton code so that spatial distribution of local point clouds can be organized into one group of local point clouds numbered $b_1$, $b_2$, ..., $b_i$, ..., $b_{8^d}$.

4. The point cloud stripe division method according to claim 1, characterized by a threshold thres of the number of points beyond standard ratio ratio of the local point cloud being set when the number of points of the local point cloud is compared with the limited range in step 2); iterating all local point clouds obtained in step 1), and comparing a size relation of the number of points in each local point cloud with an upper range limit maxSize; when the number of points of the local point cloud exceeds maxSize, adding 1 to a counter num, and after the iteration is completed, calculating a proportion ratio of the local point cloud where the number of points exceeds maxSize; if the proportion ratio exceeds the threshold thres, then the current local point cloud structure being spatially divided; if the proportion ratio does not exceed the threshold thres, preliminary space division being completed such that the structure of the current local point cloud is kept and the next operation is carried out.

5. The point cloud stripe division method according to claim 1, characterized in that a method for re-segmenting the local point clouds in step 3) is implemented by traversing all local point clouds in an order of Morton code, wherein the local point cloud $b_i$ whose number of points exceeds maxSize need to be re-segmented with technical details of the re-segmentation including:
(1) firstly, distribution variances of the local point cloud $b_i$ along a three-dimensional coordinate axis being calculated as var_X(i), var_Y(i) and var_Z(i), respectively, wherein taking var_X(i) as an example, calculation formula is as follows:

$$\text{var\_}X(i)=1/N\Sigma_{n=1}^{N}(X_{i(n)}-\overline{X}_i)^2,$$

wherein i is an index of the current local point cloud in the order of the Morton code, N is the number of points numSize(i) in the current local point cloud $b_i$, $X_{i(n)}$ is X coordinate value of the $n^{th}$ point in the local point cloud $b_i$, and $\overline{X}_i$ is X coordinate mean value of all points in the local point cloud $b_i$;
(2) in the local point cloud, a coordinate axis with the maximum variance max (var_X(i), var_Y(i), var_Z(i)) being selected as a redivision direction, and calculation formula of redivided number num being as follows:

$$num=\text{ceil}(N/\text{maxSize}).$$

through the above steps, one frame of complete point cloud being re-segmented to obtain one group of new local point clouds, and the total number thereof being Num.

6. The point cloud stripe division method according to claim 1, characterized in that a method for re-fusing the re-segmented local point clouds in step 3) comprises iterating all local point clouds according to the order of the Morton code, wherein the local point cloud $b_i$ with less number of points than minSize needs to be re-fused, and the fusion direction can be selected from forward fusion or backward fusion, wherein
assuming that the number of points of local point cloud after forward fusion is $b_i$(mergeFront) and the number of points of local point cloud after backward fusion is $b_i$(mergeNext), selection principle of a fusion direction is as follows:
(1) if $b_i$(mergeFront)>maxSize and $b_i$(mergeNext)>maxSize, the direction is selected to be max ($b_i$(mergeFront), $b_i$(mergeNext));
(2) if $b_i$(mergeFront)>maxSize and $b_i$(mergeNext)>maxSize, the direction is selected to be max ($b_i$(mergeFront), $b_i$(mergeNext));
(3) in other cases, the direction is selected to be min ($b_i$(mergeFront), $b_i$(mergeNext)).

* * * * *

UNITED STATES PATENT AND TRADEMARK OFFICE
CERTIFICATE OF CORRECTION

PATENT NO. : 11,875,513 B2
APPLICATION NO. : 17/265897
DATED : January 16, 2024
INVENTOR(S) : Ge Li et al.

Page 1 of 1

It is certified that error appears in the above-identified patent and that said Letters Patent is hereby corrected as shown below:

On the Title Page

Item (71), "PEKING UNIVERSTIY SHENZHEN GRADUATE SCHOOL" should read
--PEKING UNIVERSITY SHENZHEN GRADUATE SCHOOL--.

In the Claims

In Column 9, Claim 5, Line 39, "var_$X(i)$=1/$N\Sigma_{n=1}^{N}(X_{i(n)}-\overline{X_i})^2$" should read
-- $\text{var\_X(i)} = \frac{1}{N}\sum_{n=1}^{N}(X_{i(n)} - \overline{X}_i)^2$ --.

In Column 10, Claim 5, Line 12, "*num*=ceil(*N*/maxSize)" should read -- $num = \text{ceil}\left(\frac{N}{\text{maxSize}}\right)$ --.

In Column 10, Claim 6, Lines 33-35, "(2) if $b_i$ (*mergeFront*) > *maxSize* and $b_i$ (*mergeNext*) > *maxSize*, the direction is selected to be max ($b_i$(*mergeFront*), $b_i$(*mergeNext*))" should read --(2) if $b_i$(*mergeFront*) < *maxSize* and $b_i$(*mergeNext*) < *maxSize*, the direction is selected to be max ($b_i$(*mergeFront*), $b_i$(*mergeNext*))--.

Signed and Sealed this
Ninth Day of April, 2024

Katherine Kelly Vidal
*Director of the United States Patent and Trademark Office*